AUTOMATIC INFORMATION INDEXING

Filed Jan. 2, 1964 2 Sheets-Sheet 1

Fig. 1

12 1 11

THE PRESIDENT OF THE UNITED STATES RETURNED FROM EUROPE AFTER ATTENDING A MEETING WITH LEADERS OF NATO COUNTRIES.
AT THE MEETING HELD IN PARIS FRANCE, A MESSAGE BY PREMIER KHRUSCHEV OF SOVIET RUSSIA WAS DISCUSSED.

(a)

n 14 13

THE COMMISSIONER OF BASEBALL ANNOUNCED TODAY THAT ALL ATHLETES, PARTICIPATING IN A PICKET LINE OF ANY STRIKING UNION, WILL BE SUSPENDED FROM ALL ATHLETIC COMPETITION.

(b)

1 16 AAARR 15

| | |
|---|---|
| THE PRESIDENT OF THE UNITED | |
| STATES RETURNED FROM EUROPE | A |
| AFTER ATTENDING A MEETING WITH | A |
| LEADERS OF NATO COUNTRIES. | A |
| AT THE MEETING HELD IN PARIS | |
| FRANCE, A MESSAGE BY PREMIER | R |
| KHRUSCHEV OF SOVIET RUSSIA WAS | R |
| DISCUSSED. | |

(c)

n SLLS

| | |
|---|---|
| THE COMMISSIONER OF BASEBALL | S |
| ANNOUNCED TODAY THAT ALL ATHLETES, | |
| PARTICIPATING IN A PICKET LINE OF | L |
| ANY STRIKING UNION, WILL BE | L |
| SUSPENDED FROM ALL ATHLETIC | |
| COMPETITION. | S |

(d)

Fig. 2

| | |
|---|---|
| NATO | A |
| EUROPE | A |
| FRANCE | A |
| ITALY | A |
| ENGLAND | A |
| COMMUNISM | R |
| KHRUSCHEV | R |
| RUSSIA | R |
| REVOLUTION | R |
| BASEBALL | S |
| SPORT | S |
| ATHLETIC | S |
| GOLF | S |
| HOCKEY | S |
| NUCLEAR | N |
| RADIOACTIVE | N |
| FALLOUT | N |
| ATOMIC | N |
| UNION | L |
| STRIKE | L |
| BOYCOTT | L |
| PICKET | L |
| NEGRO | C |
| SEGREGATION | C |
| DESEGREGATION | C |
| CONSTITUTION | C |
| CITIZENS | C |

CHRISTINE A. MONTGOMERY
LOUIS C. RAY
DON R. SWANSON
INVENTORS

BY Allen M. Sutton

ATTORNEY

INVENTORS
CHRISTINE A. MONTGOMERY
LOUIS C. RAY
DON R. SWANSON
BY Allen M. Sutton
ATTORNEY United States Patent Office 3,309,677 Patented Mar. 14, 1967

3,309,677

AUTOMATIC INFORMATION INDEXING

Christine A. Montgomery, Hollywood, and Louis C. Ray, Los Angeles, Calif., and Don R. Swanson, Chicago, Ill., assignors, by mesne assignments, to The Bunker-Ramo Corporation, Stamford, Conn., a corporation of Delaware Filed Jan. 2, 1964, Ser. No. 335,108
15 Claims. (Cl. 340—172.5)

The present invention relates to a system for automatically indexing information, and more particularly to a system for automatically detecting key words in messages and classifying messages according to those key words.

Information is generally defined as knowledge derived from instruction, observation or reading. On the basis of knowledge derived from reading, humans can summarize old facts and evolve new concepts and ideas. The human ability to correlate and interrelate information extends to both related and unrelated facts or data. Indeed, any part or fragment of a source of information, like a document, message or book, may serve as the basis of future concepts or theories. However, the amount of reading material presently available is so great that it is impossible for even the most studious person to assimilate all of the information contained therein. Even those specializing in particular fields of study cannot, in their lifetime, absorb al lthe information available to them in their particular field of interest. Therefore, a growing need has developed for high speed machines capable of carrying out the sorting, correlating and abstracting of information in accordance with at least the more simplified type of criteria, thereby permitting the human being to devote more of his time and ability to more complex information correlation and abstraction.

One example of seemingly endless sources of information is the news wire service continuously supplying messages concerning a variety of subjects. Such messages often are without a characteristic structure, and furthermore, the messages widely vary in length and subject matter. However, one common characteristic of such messages is that each message includes one or more fragments of information such as key words or phrases which may yield a clue to the major subject or topic of the message. Therefore, if such fragments of information can be detected automatically, each message may be classified according to its major subject or subjects, without the need of reading the message in its entirety, thus greatly reducing the need of extensive reading. As used herein, the term "fragment of information" is taken to mean a word, phrase or clause, although for illustrative purposes the invention will be described with reference to "words." For example, the presence in messages of such key words as golf, disarmament, and debutantes, may conveniently be used to classify such messages as relating to the subject of sports, international politics and society, respectively. Each of the major subjects of interest may embrace a series of words, any one of which, when detected in a message, may serve as a guide and indication of the subject of the message and therefore be used as the basis for automatically indexing the message according to the subject to which the key word relates.

In the practice of the present invention, means are provided for automatically reading information such as may be contained in news service messages which is presented on machine readable media, such as magnetic tape or punched tape. According to the teachings disclosed herein, means are provided for printing each entire message or selected portions thereof, and comparing each word in each message with prestored list of words, each word in the list having been codified as pertaining to one or more subjects of interest. Whenever a word in any of the messages matches to a predetermined extent one of the prestored words, an alphanumeric or symbolic code assigned the subject to which the prestored word belongs is printed out as a marginal tag at predetermined locations on the medium on which the reprinted message appears.

According to the teachings of the present invention, read-in means "read" input information present in news service messages which messages are transcribed on machine readable media. Such media may comprise punched paper tape which may be generated as a subproduct of a standard Teletype machine. Punched cards and magnetic tape are other examples of media that may be used to record messages for use in automatic reading machines, wherein electromechanical, photoelectric or magnetic reading techniques are employed, depending on the particular input medium used. Each input message is identifiable by a code which after being read by the read-in means, is automatically converted and supplied as signals to a buffer for print-out means which serves as the output circuit of the system. The signals supplied thereto are used to type or print the message-identifying code on cards or other output media in alphanumeric symbols, or in any other preselected format for either human or machine interpretation. After the code of an input message has been sent to the print-out means, the first word of the content or text of the message is automatically read by the read-in means which sends a series of signals divided into groups, each group representing a letter of the word, to the buffer for the print-out means where it is stored until a complete line of symbols or words are read. The print-out means then automatically types or prints the line of words on the card previously coded with the message-identifying code. At substantially the same time as the signals corresponding to the first word are sent to the buffer, signals corresponding to the first word of the message are also supplied to an input register which is of sufficient bit capacity to temporarily store all the signals representing the largest possible word in any message that may be read by the system. Once the word has been read by the read-in circuit and its corresponding signals registered in the input register, a signal stops the read-in circuit from reading a second word, the signal further triggering a search of a word storage unit. The word storage unit is in essence a computer-type memory, wherein signals corresponding to preselected fragments of information, such as a list of words, have been stored. The words within the list are divided into groups, each group being related to a particular subject of interest, with all words within each group being coded with signals representing the particular subject of interest. The word storage unit, upon being triggered by the signal referred to hereinbefore, sequentially supplies signals corresponding to each word and its associated code stored therein to a search register similar to the input register which has a bit capacity sufficient to store temporarily all the signals corresponding to the longest word and its code that may have been stored within the word storage unit. The signals in the input register are continuously compared with the signals sequentially supplied to the search register, and whenever the signals in both register are identical, signals of the subject code associated with the signals corresponding to a given word in the search register are supplied to the print-out means buffer, wherein they cause the code to be typed out as a marginal tag on the same line that the first text word has been typed on. In order to simplify the following description the various circuits, such as the registers and the word storage unit, will be referred to as storing words rather than signals corresponding to words. Upon completing the transfer to the buffer of the subject code associated with a word similar to the first word of the input message, or upon searching the entire word storage unit without finding a word identical to the word in the input register, the system is recycled, clearing all registers and causing the read-in circuit to supply a second word to the input register and the comparing process of the second word with each of the words stored in the ford storage unit is initiated. The print-out means may further be operated to print out the code of any detected word in a message, as a subjec heading of the message at a predermined location, so that all the subject codes of a message may conveniently be observed. In addition the print-out means may be operable to suppress from printing out, those portions, such as paragraphs, of messages which do not contain any words which are similar to any of the coded words in the word storage unit.

For a better understanding of the invention, together with further objects and advantages thereof, reference is made to the following description taken in conjunction with the accompanying drawings in which:

FIGS. 1(*a*) and 1(*b*) represent examples of input information useful in explaining the present invention;

FIGS. 1(*c*) and 1(*d*) represent examples of output information useful in explaining the invention;

FIG. 2 represents an example of a coded list of words that may be used in practicing the invention;

Referring now to FIG. 1(*a*), there is shown a message 11 identified by a code designated by numeral 12. Such a message is an example of the type of news wire messages which may automatically be typed out on punched paper tape by well known Teletype machines, such machines being adaptable to type out messages on machine-readable media, such as punched tape or punched cards. Let us assume, for explanatory purpose, that the message 11 of FIG. 1(*a*) is a first message of a group of *n* messages 13 shown in FIG. 1(*b*) representing the *n*th message in the group, as indicated by a code number *n* designated as numeral 14. It is further assumed that the *n* messages are to be automatically classified and indexed by comparing fragments of information such as each word in the *n* messages with other fragments of information such as a list of words as shown in FIG. 2 wherein each word has a letter code associated therewith. Each code has been preselected and is assumed to represent a particular subject of interest. For example, the code A (FIG. 2) may represent the subject of Western Alliance, while the code C may represent the subject of Civil Rights. For explanatory purposes only, in the following description, the codes R, S, N and L represent the subjects of Russia, Sports, Nuclear Science and Labor, respectively; however, it is apparent that any code may be chosen to represent any selected subject of interest. All the words within the list shown in FIG. 2 which are coded by the same code are regarded as keywords, any one of which, when detected in any of the *n* messages, serves to classify and index the message by the particular subject code.

Figure 3:
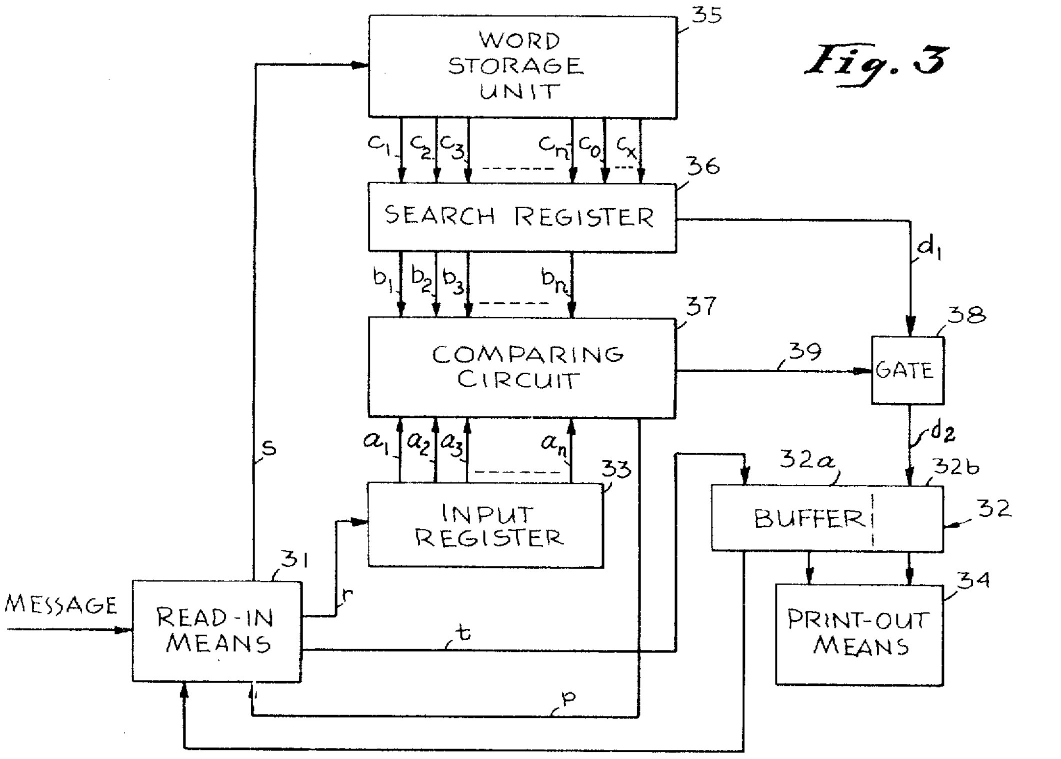
FIG. 3 is a block diagram of one embodiment of the present invention.

One embodiment of the system of the present invention is shown in FIG. 3 in block diagram, wherein read-in means 31 is assumed to receive the message 11 of FIG. 1(*a*). The read-in means 31 is operable to read alphanumeric symbols of any incoming message and convert them to respective electrical signals. All the signals representing each word or number are supplied by the read-in circuit through a coupling line *r* to an input register 33 which is of sufficient capacity to temporarily store the signals therein. The read-in means 31 simultaneously supplies through a coupling line *t* signals representing the word in the input register 33 to a buffer storage unit 32, whose function will be later described. The output of the buffer 32 is provided to recording or print-out means 34 which converts the electrical signals into printed words. Let us assume that the first word "The" of the message 11 (FIG. 1(*a*)) has been entered in the input register 33 and simultaneously stored in the buffer 32. Upon completing these two simultaneously performed steps, and after sensing the end of the word "The" either by detecting the space following it or by any other coding used to denote an end of a word, the read-in means 31 triggers, through line *s*, storage means such as a word storage unit 35, wherein all the words with their respective codes as shown in FIG. 2 have been previously stored. Upon being triggered, the word storage unit 35 sequentially supplies each word stored therein, and its code, to a search register 36. The word is supplied through lines $c_1$–$c_n$ and the code is supplied through lines $c_o$–$c_x$. The search register 36 is similar to the input register 33 but has greater capacity, to temporarily store the signals representing each word and the code associated with such word supplied thereto. The registers 33 and 36 energize a comparing circuit 37 with signals representing the words stored in them by means of connecting lines $a_1$–$a_n$ and $b_1$–$b_n$, respectively. The comparing circuit 37 may comprise a plurality of signal gating circuits arranged in a manner well known to those skilled in the art. At substantially the same time as the comparison is made, the signals in the search register 36 representing only the code of the word temporarily stored therein are being simultaneously supplied through a line $d_1$ to a gate 38 which opens only upon being energized by a pulse from the comparing circuit 37 supplied thereto via line 39 to, in turn, provide the code signals to the buffer 32.

In the present example, it is assumed that the input register 33 stores the first word "The" of the message 11 and that appropriate signals representing that word are supplied by means of lines $a_1$ to $a_n$ to the comparing circuit 37. The techniques of supplying signals representing words to registers for comparison purposes are quite well known in the art; therefore, a detailed description of their operation is deemed unnecessary. At the same time the search register 36 supplies to the comparing circuit 37 signals representing the word NATO which is the first word which has been supplied to it by the word storage unit 35 from the word list stored therein (see FIG. 2). Since the signals representing the words "The" and "NATO" are not identical, the comparing circuit 37 will prevent a pulse from appearing on line 39, thereby keeping the gate 38 closed so that the signals representing the code "A" in the register 36, which is associated with the word NATO, are blocked from passing through to the buffer 32 through line $d_2$. The search register 36 will then be supplied with the second word and its code in the word list of the word storage unit 35, namely the word "Europe" and the comparing process in the comparing circuit will then be resumed. After all the key words in the word storage unit 35 have been compared with the word in the input register 33, a word indicating that fact may be received from the storage unit 35 to cause a pulse on a line *p* from the comparing circuit 37 to the read-in circuit 31. That pulse activates the read-in circuit to supply the second word of the message 11 (President) to the input register and to the buffer 32, and once again all the words in the storage unit 35 will be compared with the word "President." From comparing FIG. 1(*a*) and FIG. 2, it is clear that the first identical word appearing in both the message 11 and the word list of FIG. 2 is the word "Europe." Upon that word being supplied by the registers 33 and 36 to the comparing circuit 37, a pulse will appear on line 39 opening the gate 38 so that the signals representing the code A associated with the word Europe (see FIG. 2) may pass from the search register 36 to the buffer 32.

The buffer 32 is of sufficient capacity to provide storage for the symbols comprising one line of the message plus storage for the maximum number of codes expected to be required for that one line. Signals representing the words of the message are fed into a section **32*a* of the buffer, and signals representing the codes are stored in another section 32*b*. When a full line of text is stored in the buffer, it automatically dumps and actuates the print-out means 34. As the buffer dumps, it provides a signal to inhibit the read-in means 31**, so that a symbol cannot be lost during the dump operation.

The print-out means may comprise various devices, such as line printers or typewriters. A line printer with its associated control circuitry provides convenient print-out means whereby all sections of the buffer may be dumper and the information contained therein transferred to the print-out means in parallel in a minimum amount of time. Of course, the invention is not limited to the use of any particular print-out means. The signals representing the letter A associated with the first identical word "Europe" may be printed by the print-out means 34 on the same line as the word Europe, as shown in FIG. 1(*c*) wherein the code letter A is designated by numeral 15. The code letter A associated with the word Europe may further be typed as a message heading as indicated by numeral 16 in FIG. 1(*c*). In addition, the subject Western Alliance with or without its code letter A may be typed out as the message heading. The search and comparing process will automatically continue until each of the words of the message 11 of FIG. 1(*a*) has been compared with all the words in the list of FIG. 2 which are stored in the word storage unit 35.

It is apparent from the operation described that the system shown in FIG. 3 automatically produces an output message as shown in FIG. 1(*c*). Key words such as Europe, NATO, France, Khrushchev and Russia have been automatically detected and the message indexed by codes A and R which represent the subjects of Western Alliance and world Communism, respectively. The message designated by numeral 13 in FIG. 1(*b*) may similarly be automatically read by the system shown in FIG. 3, so that key words in the message, such as "baseball," "picket," "union" and "athletic" are detected, causing the message to be indexed by the codes S and L, as shown in FIG. 1(*d*), thereby automatically classifying the message with the subjects of Sports and Labor, respectively.

The particular registers shown in FIG. 3 as well as other circuitry which may be incorporated therein have not been specified since different specific embodiments of circuits presently known in the art may be incorporated without departing from the teachings of the invention. Similarly, conventional subsystems of present day computers may be combined to comprise the system described herein.

It is apparent to one skilled in the art that the word storage unit 35 will contain a storage element or elements, logic circuitry for sequentially reading words into and out of the storage elements, and synchronizing means such as a clock pulse generator or pre-recorded clock pulses. Such devices are well known in the art and need not be further described.

The read-in means 31 may comprise a conventional punched paper tape reader adapted to stop reading after each word and to remain stopped until a start signal is received from the comparing circuit 37. The tape reader may also be adapted to stop reading momentarily when a signal is received from the buffer 32 to give the buffer time to transfer its contents to the print-out means 34. Such adaptations are well known to those skilled in the art.

Figure 4:
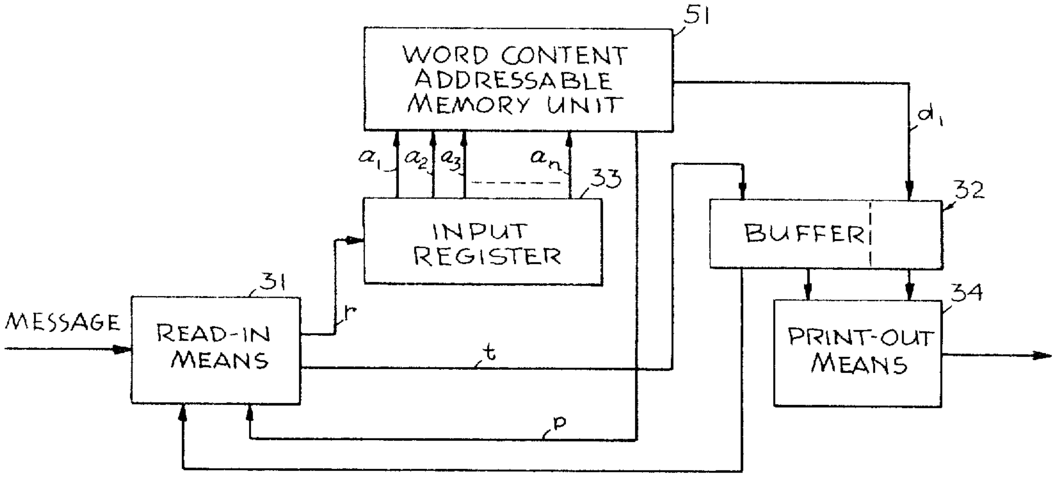
FIG. 4 is a block diagram of another embodiment of the present invention.

The system embodying the present invention as previously described is relatively slow, since the comparing or searching operation is sequentially performed by comparing each word in the word storage unit with each word of each incoming message in sequence. Such a method and system will be adequate where time is not of the essence or where the list of words in the storage unit is relatively short. However, whenever a great number of messages have to be indexed in a relatively short period, another embodiment of the present invention may be employed, as shown in FIG. 4, wherein the comparing circuit 37, the search register 36 and the word storage unit 35 of FIG. 3 are integrated within a word content addressable memory unit 51. Such a unit is fully described in U.S. patent application Serial No. 269,009, entitled "Content Addressable Memory," filed March 29, 1963, by Ralph J. Koerner and Alfred D. Scarbrough and assigned to the assignee of the present invention.

By employing a unit as described in the referenced application, it is possible to compare a word in the input register 33 simultaneously with all the words in the word content addressable memory unit wherein a list of words similar to that of FIG. 2 may have been stored. It seems apparent then that such a technique of simultaneously comparing the entire list with a word in a message greatly reduces the time required for the comparing operation of the present invention.

In still another embodiment of the present invention, an entire line of a message is temporarily stored in an input register which is similar to the input register 33 but of greater bit capacity. After so storing the line, each word therein is sequentially compared by using well known masking techniques with the words in the word content addressable memory unit 51, so that the total time necessary for automatically indexing machine-readable messages may be further reduced.

Summarizing briefly, the present invention discloses a system for automatically indexing information with codes which correspond to subjects of interest contained therein. The various embodiments of the invention described above include techniques and circuitry for automatically reading-in information presented on machine readable media, detecting fragments of information within such read-in information which correspond to precoded fragments and finally printing out the information which is indexed with any or all of the codes which correspond to the fragments automatically detected therein.

It is apparent that the invention provides a system which has many applications in automatic information analysis and it is therefore not intended to be limited by the specific embodiments shown or described. Various changes in the applications as well as modifications in the method and system may be made by one skilled in the art without departing from the true spirit and scope of the invention.

The embodiments of the invention in which an exclusive property or privilege is claimed are defined as follows:

1. A system for automatically indexing information comprising:

first means responsive to input information for comparing said input information with information stored therein and detecting correspondence therebetween; and second means for indexing said input information with codes representing said information stored in said first means which has been detected to correspond to said input information.

2. A system for automatically indexing information comprising:

first means responsive to input information for comparing said input information with information stored therein and detecting correspondence therebetween; and second means for recording said input information along with codes representing only the information stored in said first means which has been detected to correspond to a predetermined extent to said input information.

3. A system for automatically indexing information comprising:

first means responsive to input information for producing signals corresponding thereto;

second means for storing therein preselected information and adapted to produce signals corresponding to said preselected information;

third means including comparing means responsive to the signals produced by said first means and by said second means for comparing the signals corresponding to said input information and said preselected information and producing output signals only when said preselected information and said input information are similar to a predetermined extent, said output signals corresponding to codes representing said preselected information; and fourth means responsive to the signals produced by said first means and to the output signals of said third means for recording said input information along with the codes representing said preselected information which has been compared and found to be similar to said input information.

4. A system for automatically indexing information comprising:

input means responsive to an input word for producing signals corresponding thereto;

storage means for storing a plurality of preselected words and producing signals corresponding thereto;

comparing means responsive to the signals produced by said input means and by said storage means for comparing the signals corresponding to said input word with the signals corresponding to each of said preselected words and providing output signals only when there is a predetermined correspondence between said input word and one of said preselected words, said output signals corresponding to a code representing said one of said preselected words; and means responsive to the signals produced by said input means for recording said input word and to the signals provided by said comparing means for recording said code representing said one of said preselected words.

5. A system for automatically indexing information comprising:

input means responsive to an input word for producing signals corresponding thereto;

storage means for storing a plurality of preselected words and producing signals corresponding thereto;

comparing means responsive to the signals produced by said input means and by said storage means for sequentially comparing the signals corresponding to said input word with the signals corresponding to each of said preselected words and providing output signals only when there is a predetermined correspondence between said input word and one of said preselected words, said output signals corresponding to a code representing said one of said preselected words; and means responsive to the signals produced by said input means for recording said input word and to the signals provided by said comparing means for recording said code representing said one of said preselected words.

6. A system for automatically indexing information comprising:

input means responsive to an input word for producing signals corresponding thereto;

storage means for storing a plurality of preselected words and producing signals corresponding thereto;

comparing means responsive to the signals produced by said input means and by said storage means for simultaneously comparing the signals corresponding to said input word with the signals corresponding to each of said preselected words and providing output signals only when there is a predetermined correspondence between said input word and one of said preselected words, said output signals corresponding to a code representing said one of said preselected words; and means responsive to the signals produced by said input means for recording said input word and to the signals provided by said comparing means for recording said code representing said one of said preselected words.

7. A system for automatically indexing information comprising:

input means responsive to an input fragment of information for producing signals corresponding thereto;

storage means for storing a plurality of preselected fragments of information and producing signals corresponding thereto;

comparing means responsive to the signals produced by said input means and by said storage means for comparing the signals corresponding to said input fragment with the signals corresponding to each of said preselected fragments and providing output signals only when there is a predetermined correspondence between said input fragment and one of said preselected fragments, said output signals corresponding to a code representing said one of said preselected fragments; and means responsive to the signals produced by said input means for recording said input fragment and to the signals provided by said comparing means for recording said code representing said one of said preselected fragments.

8. A system for automatically indexing information comprising:

input means responsive to an input fragment of information for producing signals corresponding thereto;

storage means for storing a plurality of preselected fragments of information and producing signals corresponding thereto;

comparing means responsive to the signals produced by said input means and by said storage means for sequentially comparing the signals corresponding to said input fragment with the signals corresponding to each of said preselected fragments and providing output signals only when there is a predetermined correspondence between said input fragment and one of said preselected fragments, said output signals corresponding to a code representing said one of said preselected fragments; and means responsive to the signals produced by said input means for recording said input fragment and to the signals provided by said comparing means for recording said code representing said one of said preselected fragments.

9. A system for automaticaly indexing information comprising:

input means responsive to an input fragment of information for producing signals corresponding thereto;

storage means for storing a plurality of preselected fragments of information and producing signals corresponding thereto;

comparing means responsive to the signals produced by said input means and by said storage means for simultaneously comparing the signals corresponding to said input fragment with the signals corresponding to each of said preselected fragments and providing output signals only when there is a predetermined correspondence between said input fragment and one of said preselected fragments, said output signals corresponding to a code representing said one of said preselected fragments; and means responsive to the signals produced by said input means for recording said input fragment and to the signals provided by said comparing means for recording said code representing said one of said preselected fragments.

10. A system for automatically indexing information comprising:

read-in means responsive to an input word for producing signals corresponding thereto;

storage means for storing a plurality of preselected words and a code representing each of said preselected words, and producing signals corresponding to each of said preselected words and codes;

comparing means responsive to the signals produced by said read-in means and by said storage means for comparing the signals corresponding to said input word with the signals corresponding to each of said preselected words and providing output signals only when there is a predetermined correspondence between said input word and one of said preselected words, said output signals corresponding to the code representing said one of said preselected words; and means responsive to the signals produced by said read-in means and to the signals provided by said comparing means for recording said input word along with said code representing said one of said preselected words.

11. A system for automatically indexing information comprising:

read-in means responsive to an input word for producing signals corresponding thereto;

storage means for storing a plurality of preselected words and a code representing each of said preselected words, and producing signals corresponding to each of said preselected words and codes;

comparing means responsive to the signals produced by said read-in means and by said storage means for sequentially comparing the signals corresponding to said input word with the signals corresponding to each of said preselected words and providing output signals only when there is a predetermined correspondence between said input word and one of said preselected words, said output signals corresponding to the code representing said one of said preselected words; and means responsive to the signals produced by said read-in means and to the signals provided by said comparing means for recording said input word along with said code representing said one of said preselected words.

12. A system for automatically indexing information comprising:

read-in means responsive to an input word for producing signals corresponding thereto;

storage means for storing a plurality of preselected words and a code representing each of said preselected words, and producing signals corresponding to each of said preselected words and codes;

comparing means responsive to the signals produced by said read-in means and by said storage means for simultaneously comparing the signals corresponding to said input word with the signals corresponding to each of said preselected words and providing output signals only when there is a predetermined correspondence between said input word and one of said preselected words, said output signals corresponding to the code representing said one of said preselected words; and means responsive to the signals produced by said read-in means and to the signals provided by said comparing means for recording said input word along with said code representing said one of said preselected words.

13. A system for automatically indexing information comprising:

read-in means responsive to an input fragment of information for producing signals coresponding thereto;

storage means for storing a plurality of preselected fragments of information and a code representing each of said preselected fragments, and producing signals corresponding to each of said preselected fragments and codes;

comparing means responsive to the signals produced by said read-in means and by said storage means for comparing the signals corresponding to said input fragment with the signals corresponding to each of said preselected fragments and providing output signals only when there is a predetermined correspondence between said input fragment and one of said preselected fragments, said output signals corresponding to the code representing said one of said preselected fragments; and means responsive to the signals produced by said read-in means and to the signals provided by said comparing means for recording said input fragment along with said code representing said one of said preselected fragments.

14. A system for automatically indexing information comprising:

read-in means responsive to an input fragment of information for producing signals corresponding thereto;

storage means for storing a plurality of preselected fragments of information and a code representing each of said preselected fragments, and producing signals corresponding to each of said preselected fragments and codes;

comparing means responsive to the signals produced by said read-in means and by said storage means for sequentially comparing the signals corresponding to said input fragment with the signals corresponding to each of said preselected fragments and providing output signals only when there is a predetermined correspondence between said input fragment and one of said preselected fragments, said output signals corresponding to the code representing said one of said preselected fragments; and means responsive to the signals produced by said read-in means and to the signals provided by said comparing means for recording said input fragment along with said code representing said one of said preselected fragments.

15. A system for automatically indexing information comprising:

read-in means responsive to an input fragment of information for producing signals corresponding thereto;

storage means for storing a plurality of preselected fragments of information and a code representing each of said preselected fragments, and producing signals corresponding to each of said preselected fragments and codes;

comparing means responsive to the signals produced by said read-in means and by said storage means for simultaneously comparing the signals corresponding to said input fragment with the signals corresponding to each of said preselected fragments and providing output signals only when there is a predetermined correspondence between said input fragment and one of said preselected fragments, said output signals corresponding to the code representing said one of said preselected fragments; and means responsive to the signals produced by said read-in means and to the signals provided by said comparing means for recording said input fragment along with said code representing said one of said preselected fragments.

No references cited.

ROBERT C. BAILEY, *Primary Examiner.*

R. B. ZACHE, *Assistant Examiner.*